No. 763,193. Patented June 21, 1904.

UNITED STATES PATENT OFFICE.

ERNST MATHE, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

BLUE SULFUR DYE AND PROCESS OF MAKING SAME.

SPECIFICATION forming part of Letters Patent No. 763,193, dated June 21, 1904.

Application filed March 30, 1904. Serial No. 200,794. (No specimens.)

*To all whom it may concern:*

Be it known that I, ERNST MATHE, Ph. D., chemist, a citizen of the Empire of Germany, residing at Höchst-on-the-Main, Germany, have invented certain new and useful Improvements in the Manufacture of a Blue Sulfurized Dyestuff, of which the following is a specification.

Diparaoxyphenyl-para-para$_1$-diamidodiphenylamin crystallizes when pure in the form of colorless leaflets, which melt at about 208° centigrade. This substance may be obtained by simultaneously oxidizing para-para$_1$-diamidodiphenylamin and phenol or diphenylamin and para-amidophenol, both in molecular proportions of one to two, or by the action of quinonechlorimid on diphenylamin in molecular proportions of two to one. In any of these cases indophenol is obtained, which on being reduced yields dipara-oxyphenyl-para-para$_1$-diamidodiphenylamin.

Example: Three hundred parts of the base of dipara-oxyphenyl-para-para$_1$-diamidodiphenylamin are boiled for six hours in a reflux apparatus with eight hundred parts of crystallized sodium sulfid and three hundred and forty parts of sulfur and four hundred parts of glycerin, the temperature then being 100° to 110° centigrade. The evolution of hydrogen sulfid occurs already at 80° centigrade, and the base dissolves gradually. The mass is then diluted with water, reboiled, and filtered. Air is introduced into the green filtrate, whereupon the dyestuff is precipitated. It is then filtered and dried.

Having now described my invention, what I claim is—

1. The manufacture of a blue dyestuff from dipara-oxyphenyl-para-para$_1$-diamidodiphenylamin, which consists in heating this substance with sodium sulfid and sulfur for some time to 100° to 120° centigrade and in precipitating the dyestuff thus obtained from the mass diluted with water, substantially as set forth.

2. As new product, a blue dyestuff from dipara-oxyphenyl-para-para$_1$-diamidodiphenylamin as herein described, being when dry a dark-blue powder of metallic luster, insoluble in water, alcohol, ether, benzene, glacial acetic acid and dilute acids, soluble in dilute alkali lye with a blue, in concentrated sulfuric acid with a green color; the green solution of the dyestuff in sodium-sulfid solution dyeing cotton fast indigo-blue shades.

In testimony that I claim the foregoing as my invention I have signed my name in presence of two subscribing witnesses.

ERNST MATHE.

Witnesses:
 ALFRED BRISBOIS,
 JOSEPH FLACH.